(12) United States Patent
Nie et al.

(10) Patent No.: US 11,599,801 B2
(45) Date of Patent: Mar. 7, 2023

(54) METHOD FOR SOLVING PROBLEM, COMPUTING SYSTEM AND PROGRAM PRODUCT

(71) Applicant: EMC IP Holding Company LLC, Hopkinton, MA (US)

(72) Inventors: YuHong Nie, Shanghai (CN); WuiChak Wong, Xiamen (CN); Sanping Li, Beijing (CN); Xuwei Tang, Nanjing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 482 days.

(21) Appl. No.: 16/825,389

(22) Filed: Mar. 20, 2020

(65) Prior Publication Data
US 2021/0271987 A1    Sep. 2, 2021

(30) Foreign Application Priority Data
Feb. 27, 2020 (CN) .......................... 202010125604.4

(51) Int. Cl.
*G06N 5/02* (2023.01)
*G06N 5/022* (2023.01)

(52) U.S. Cl.
CPC .................................. *G06N 5/022* (2013.01)

(58) Field of Classification Search
None
See application file for complete search history.

(56) References Cited

U.S. PATENT DOCUMENTS

| | | | | |
|---|---|---|---|---|
| 6,292,792 B1* | 9/2001 | Baffes | ..................... | G06N 5/022 706/45 |
| 6,484,155 B1* | 11/2002 | Kiss | ....................... | G06F 16/951 706/45 |
| 7,107,185 B1* | 9/2006 | Yemini | ............... | G06F 11/2257 702/183 |
| 8,713,033 B1* | 4/2014 | Stoverink | ........ | G06Q 10/06312 707/703 |
| 2004/0044542 A1* | 3/2004 | Beniaminy | ............ | G06N 5/022 706/45 |
| 2005/0102157 A1* | 5/2005 | Soma | ..................... | G06Q 10/06 705/1.1 |
| 2005/0283498 A1* | 12/2005 | Kuo | ........................ | G06F 16/21 |

(Continued)

*Primary Examiner* — Qing Chen
(74) *Attorney, Agent, or Firm* — Ryan, Mason & Lewis, LLP (57) ABSTRACT

Embodiments of the present disclosure provide a method for solving a problem, a computing system and a program product. A method for solving a problem includes determining information related to a to-be-solved problem; acquiring, based on the information, knowledge elements that can be used for the to-be-solved problem from a knowledge repository, the knowledge repository storing: solved problems, at least one executable task related to the solved problems, at least one processing flow for implementing the at least one executable task, and a corresponding function module included in the at least one processing flow; and determining, based at least on the acquired knowledge elements, a solution to the to-be-solved problem. By such arrangements, automatic problem solving can be achieved in a faster, simpler way with a lower cost through division of the repository and the knowledge elements.

20 Claims, 6 Drawing Sheets

(56) References Cited

U.S. PATENT DOCUMENTS

| | | | |
|---|---|---|---|
| 2006/0036562 A1* | 2/2006 | Wu ..................... | G06N 5/022 |
| | | | 706/50 |
| 2006/0036563 A1* | 2/2006 | Wu ..................... | G06N 5/022 |
| | | | 706/50 |
| 2015/0149497 A1* | 5/2015 | Kanjirathinkal .... | G06F 16/3325 |
| | | | 707/765 |
| 2018/0189389 A1* | 7/2018 | Baldini Soares ... | G06F 16/9024 |

* cited by examiner

METHOD FOR SOLVING PROBLEM, COMPUTING SYSTEM AND PROGRAM PRODUCT

RELATED APPLICATION(S)

The present application claims priority to Chinese Patent Application No. 202010125604.4, filed Feb. 27, 2020, and entitled "Method for Solving Problem, Computing System and Program Product," which is incorporated by reference herein in its entirety.

FIELD

Embodiments of the present disclosure relate to the field of data analysis and, in particular, to a method for solving a problem, a computing system and a computer program product.

BACKGROUND

In recent years, with the development of the computer technology, the development and deployment of powerful automation models and algorithms have been supported to implement various tasks. However, when faced with abstract problems, such as those raised to meet the operational and management requirements of companies and organizations, users often need to spend time on deciding which automation model to use to accurately solve a particular problem. In addition, automation models, such as machine learning models, especially deep learning models, often require more manpower and time to perform processes such as data preprocessing and model training before being deployed and used. Therefore, in order to obtain an executable solution to the problem, time and economic costs are high. It would be desirable to obtain a solution to the to-be-solved problem in a faster, more efficient way with lower cost.

SUMMARY

The embodiments of the present disclosure provide an approach for solving a problem.

In a first aspect of the present disclosure, a method for solving a problem is provided. The method includes determining information related to a to-be-solved problem; acquiring, based on the information, knowledge elements that can be used for the to-be-solved problem from a knowledge repository, the knowledge repository storing: solved problems, at least one executable task related to the solved problems, at least one processing flow for implementing the at least one executable task, and a corresponding function module included in the at least one processing flow; and determining, based at least on the acquired knowledge elements, a solution to the to-be-solved problem.

In a second aspect of the present disclosure, a computing system is provided. The computing system includes at least one processor; and at least one memory storing computer program instructions, wherein the at least one memory and the computer program instructions are configured to, with the at least one processor, cause an electronic device to perform actions. The actions include determining information related to a to-be-solved problem; acquiring, based on the information, knowledge elements that can be used for the to-be-solved problem from a knowledge repository, the knowledge repository storing: solved problems, at least one executable task related to the solved problems, at least one processing flow for implementing the at least one executable task, and a corresponding function module included in the at least one processing flow; and determining, based at least on the acquired knowledge elements, a solution to the to-be-solved problem.

In a third aspect of the present disclosure, a computer program product is provided. The computer program product is tangibly stored on a non-volatile computer-readable medium and includes machine-executable instructions which, when being executed, cause a device to implement the method of the first aspect.

This Summary is provided to introduce the selection of concepts in a simplified form, which will be further described in the detailed description below. The Summary is not intended to identify key features or main features of the present disclosure, nor is it intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

DETAILED DESCRIPTION

The principles of the present disclosure will be described below with reference to several example embodiments shown in the drawings. Although such illustrative embodiments of the present disclosure are shown in the accompanying drawings, it should be understood that these embodiments are described only to enable those skilled in the art to better understand and implement the present disclosure, and not to limit the scope of the present disclosure in any way.

As used herein, the term "comprising" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc., may refer to different or the same objects. Other explicit and implicit definitions may be included below.

As used herein, "machine learning" refers to processing involving high-performance computing, machine learning, and artificial intelligence algorithms. In this article, the term "machine learning model" may also be called "learning model," "learning network," "network model," or "model." "Neural network" or "neural network model" is a deep learning model. In summary, a machine learning model is capable of receiving input data and performing predictions and outputting prediction results based on the input data.

Figure 1:
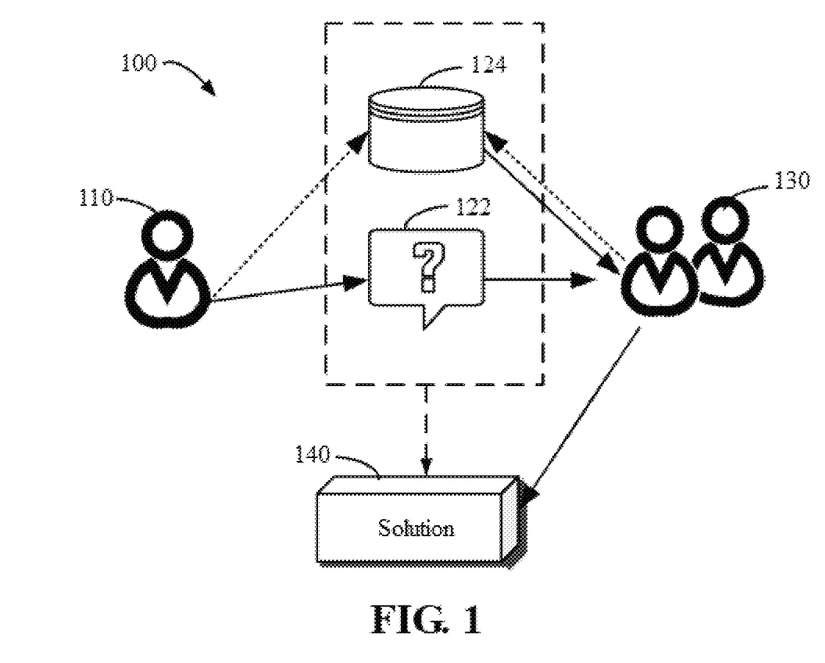
FIG. 1 illustrates a schematic diagram of a determination process of a problem-solving approach.

FIG. 1 illustrates a schematic diagram of determination process 100 of a problem-solving approach. As shown in FIG. 1, in some practical applications, user 110 (for example, a decision maker or a customer) may raise to-be-solved problem 122, such as a problem involving the operational and management requirements of companies and organizations. It is expected that a solution to to-be-solved problem 122 can be obtained. User 110 may also indicate raw data 124 for which to-be-solved problem 122 is being addressed. For example, to-be-solved problem 122 may be "determining customer activity for XX products this year." Raw data 124 may include the sales data of this product this year, including sales, sales region, sales time, potential purchasers, etc.

Generally, user 110 will direct the to-be-solved problem 122 and raw data 124 related to the to-be-solved problem 122 to user 130, such as a data analyst or a technical developer. User 130 needs to determine what technical means to use to analyze raw data 124, for example, what machine learning model to choose for analysis. After the model is selected, it is also necessary to perform tedious steps such as preprocessing of raw data 124, training of the model, tuning of the model, etc., so as to finally obtain solution 140 to to-be-solved problem 122, such as a trained machine learning model.

In the above process, the solution to the problem is obtained relying entirely on technicians. In addition, technicians need to spend a lot of time and energy to continuously attempt to construct possible solutions for each problem. Therefore, a need exists for improving the way of determining the solution to the to-be-solved problem.

According to embodiments of the present disclosure, an approach for automatic problem solving is provided. In this approach, for a given to-be-solved problem, knowledge elements that can be used for the to-be-solved problem are acquired from a pre-constructed knowledge repository using information related to the to-be-solved problem. The knowledge repository stores solved problems and solutions to the solved problems, including one or more related executable tasks, one or more processing flows for implementing the executable tasks, and corresponding function modules included in each of the processing flows.

By searching for knowledge elements from such a knowledge repository, the knowledge elements obtained from the solution to the solved problem can be used to acquire or assist in acquiring a solution to the new problem, thereby achieving automatic problem solving in a faster, simpler way with a lower cost.

The basic principles and several example embodiments of the present disclosure will be described below in detail in combination with the drawings.

As mentioned briefly above, in the embodiments of the present disclosure, the determination of the solution to the to-be-solved problem relies on the knowledge elements stored in the knowledge repository. Herein, the solutions to the solved problems are divided into a set of knowledge elements in a unified way, which can be recorded in a knowledge repository and can be reused to construct a solution to one or more problems to be solved. Prior to discussing in detail how to obtain a solution to a to-be-solved problem, the division of the unified elements that constitute the solution to the problem is first described.

In general, for a question, one or more associated executable tasks can usually be defined for use to attempt to answer this question from one or more aspects. Problems herein, including solved problems and to-be-solved problems, can include abstract problems, for example, problems with unclear specific tasks to be achieved. Such problems include abstract business problems. Executable tasks refer to tasks that can use specific technical means or tools to analyze data so as to obtain a definite analysis result. The analysis results obtained can be, for example, quantifiable numerical results or classification results. In some embodiments, executable tasks may include machine learning tasks (sometimes referred to as machine learning problems), which may be implemented by one or more machine learning models.

After each executable task is defined, it can be completed by one or more processing flows. The processing flow indicates the specific implementation of the executable task. The processing flow usually includes corresponding function modules, each of which can perform a corresponding function. The function module is computer executable, which, for example, can be a code segment, a function, or an application function unit, etc., usually with defined inputs and outputs. The function module can be a unit that can be reusable in different solutions. In one example, for a machine learning task, the processing flow may include data pre-processing at an early stage to obtain the machine learning model, the model construction process, and possibly the processing flow of the machine learning model itself.

Figure 2:
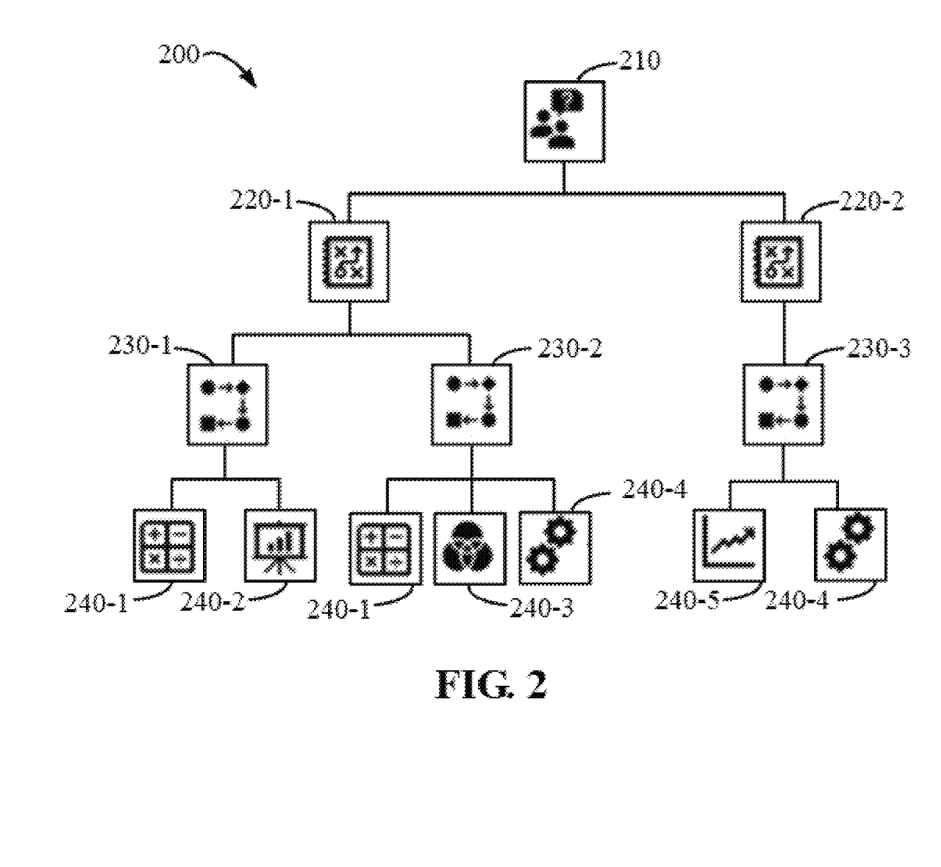
FIG. 2 illustrates a schematic diagram of the relationship of unified elements constituting solutions according to some embodiments of the present disclosure.

In combination with the previous description, the solved problem and its solution can be divided into four types of knowledge elements, including the solved problem per se, the executable tasks, processing flows, and function modules in the solution. These four types of knowledge elements are related in order. Through division in this way, tracking and reusing of the knowledge elements is facilitated. FIG. 2 shows a schematic diagram of relationship 200 of unified elements constituting solutions according to some embodiments of the present disclosure.

As shown in FIG. 2, solved problem 210 is related to one or more executable tasks, for example, executable tasks 220-1 and 220-2. One problem is related to multiple executable tasks, which is often the case in practical applications. This is because different executable tasks can analyze different types of data for the problem and obtain results from different aspects. As a specific example, suppose that solved problem 210 is "determining customer activity for XX products this year." This problem can be defined, for example, as related to two executable tasks, such as "predicting the number of customers who will purchase this product in the next quarter" and "determining the daily page views of product pages displaying this product," for example.

Further, each executable task may be implemented by one or more processing flows. For example, executable task 220-1 may be implemented by processing flows 230-1 and 230-2, and executable task 220-2 may be implemented by processing flow 230-3. Each processing flow includes corresponding function modules. The processing flow organizes multiple function modules in order, so as to achieve the corresponding executable tasks. The processing flow includes, for example, an algorithm pipeline. As mentioned above, the function modules are reusable units. As shown in FIG. 2, processing flow 230-1 includes function modules 240-1 and 240-2, processing flow 230-2 includes function modules 240-1, 240-3, and 240-4, and processing flow 230-3 includes function modules 240-5 and 240-4. It can be seen that function module 240-1 is reused in processing flows 230-1 and 230-2, while function module 240-4 is reused in processing flows 230-2 and 230-3.

Hereinafter, for convenience of description, executable tasks 220-1, and 220-2 can be collectively or individually referred to as executable task 220, and processing flows 230-1, 230-2, and 230-3 can be collectively or individually referred to as processing flow 230, and function modules 240-1 to 240-5 can be collectively or individually referred to as function module 240. It should be understood that the relationship of the knowledge elements and the number of different types of knowledge elements as shown in FIG. 2 are for illustration only. For practical problems, there can be other relationships and other numbers of knowledge elements in each type.

In the embodiments of the present disclosure, for a certain solved problem, a solution may include related executable tasks, processing flows for implementing the executable tasks, and corresponding function modules constituting the processing flows. The solved problem can include multiple solutions. The solved problem and the corresponding solutions can be stored in the knowledge repository for determining or assisting in determining solutions to subsequent problems to be solved.

Figure 3:
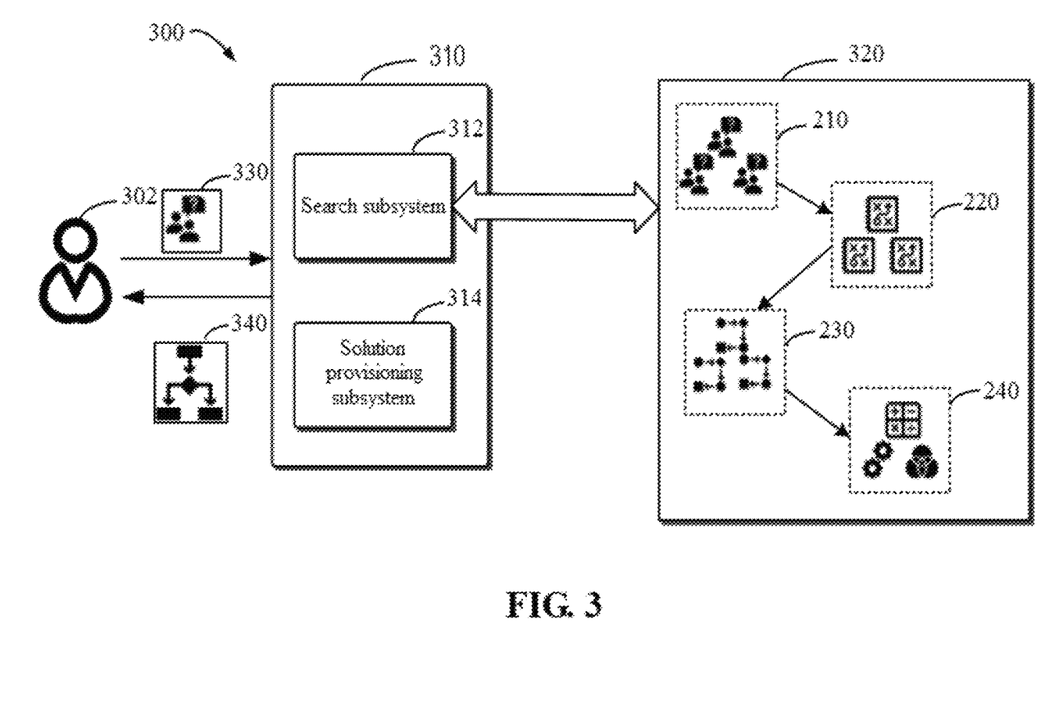
FIG. 3 illustrates a schematic diagram of an environment for implementing automatic problem solving according to some embodiments of the present disclosure.

FIG. 3 illustrates a schematic diagram of an environment 300 for implementing automatic problem solving according to some embodiments of the present disclosure. Environment 300 includes computing system 310 and knowledge repository 320.

Knowledge repository 320 stores knowledge elements that can be used to solve problems. The knowledge elements stored in knowledge repository 320 may include one or more solved problems 210 in relationship 200 of unified elements as shown in FIG. 2. Solved problem 210 is generally provided with solutions that have been constructed. Solved problem 210 may have a corresponding problem description, for example, for use to describe solved problem 210 in text, pictures, and/or other presentation manners. Knowledge repository 320 further stores one or more executable tasks 220 related to each solved problem 210, one or more processing flows 230 for implementing each executable task 220, and one or more function modules 240 included in each processing flow 230.

In knowledge repository 320, there are association relationships between the four types of knowledge elements, and for example, each two types of knowledge elements can be associated by means of linking or mapping. In this way, starting from any kind of knowledge element, other knowledge elements that constitute a specific solution to a certain solved problem can be searched out. Knowledge repository 320 can utilize various known technologies to store, organize, and manage these knowledge elements. For example, knowledge repository 320 can use a representation manner such as a knowledge graph to organize various types of knowledge elements.

In some embodiments, for a reusable unit in different solutions, such as function module 240, storage space can be saved by only storing one copy. In this way, in knowledge repository 320, different processing flows 230 may be associated to the same function module 240.

Computing system 310 is configured to utilize knowledge repository 320 to provide automatic solution determination for to-be-solved problem 330. Computing system 310 may receive a request from user 302 to provide to-be-solved problem 330. For example, computing system 310 may receive a problem description about to-be-solved problem 330. In some examples, computing system 310 may be used as a portal system for users.

Computing system 310 includes search subsystem 312 and solution provisioning subsystem 314. Search subsystem 312 may be configured to use information related to to-be-solved problem 330 to acquire the knowledge elements that can be used for to-be-solved problem 330 from knowledge repository 320. Search subsystem 312 can be implemented as a search engine, for example, and can implement search based on various types of information. Solution provisioning subsystem 314 is configured to determine solution 340 to to-be-solved problem 330 based on at least the knowledge elements acquired by search subsystem 312 and may provide solution 340 to user 302.

Depending on the knowledge currently stored in knowledge repository 320, the useful knowledge elements acquired from knowledge repository 320 may be different, for example, knowledge elements capable of forming a complete solution may be obtained, or only part of the knowledge elements may be tracked. In some examples, it may also be possible that no useful knowledge elements can be obtained at all. Detailed descriptions will be provided for various possible situations below.

In some embodiments, search subsystem 312 obtains the problem description of to-be-solved problem 330 and then attempts to search knowledge repository 320 for solved problems that match. For example, at the initial phase of solving the problem, computing system 310 may receive the problem description of to-be-solved problem 330 input from user 302, and then search subsystem 312 performs corresponding searches from knowledge repository 320. Specifically, search subsystem 312 searches knowledge repository 320 for a target solved problem matching to-be-solved problem 330.

Knowledge repository 320 stores corresponding problem descriptions for various solved problems 210. Search subsystem 312 may determine whether the target solved problem matching to-be-solved problem 330 exists in knowledge repository 320 based on the matching degree between the problem descriptions. "Matching" herein means that the degree of similarity between two subjects exceeds a certain threshold. For example, when the matching target solved problem is searched using a problem description in text format, the degree of similarity between the texts of the problem descriptions can be determined. Search subsystem 312 may utilize various search techniques to search the solved problems 210 stored in knowledge repository 320 for a target solved problem which is the same as or similar to to-be-solved problem 330.

If the target solved problem matching to-be-solved problem 330 can be found from knowledge repository 320, this usually means that at least one solution to the target solved problem has already been stored in knowledge repository 320. Therefore, search subsystem 312 may acquire, according to the found target solved problem, from knowledge repository 320 a first set of knowledge elements including: a target executable task related to the target solved problem, a target processing flow for implementing the target executable task, and a corresponding function module included in the target processing flow. These knowledge elements are stored in knowledge repository 320 as being associated with the target solved problem, for example, as having a corresponding direct link or indirectly pointing to the target solved problem, and thus they can be extracted from knowledge repository 320 starting from the target solved problem. These extracted knowledge elements constitute a solution to the target solved problem.

The first set of knowledge elements acquired by search subsystem 312 is provided to solution provisioning subsystem 314. Since the first set of knowledge elements acquired can already form a complete solution, solution provisioning subsystem 314 can form the first set of knowledge elements into solution 340 to to-be-solved problem 330. In some embodiments, if multiple solutions to the target solved problem are stored in knowledge repository 320, for example, there are multiple related target executable tasks, or each target executable task has multiple processing flows, then multiple sets of knowledge elements can be acquired accordingly to form multiple solutions 340 to to-be-solved problem 330.

In some embodiments, when performing a search regarding to-be-solved problem 330, it can also be understood that raw data to be processed for to-be-solved problem 330 is taken into consideration, especially the data format of the raw data. For example, the raw data may include one or more types of data, such as text data, image data, audio data, and chart data. Different types of data may be represented in corresponding data formats. For example, the text data can be in a TXT format, WORD format, PDF format, HTML format, etc.; the image data can be in a PNG format, JPG format, TIFF format, RAW format, etc.; the audio data can be in a WAV format, FLAC format, APE format, ALAC Format, etc.; and the chart data can be in an EXCEL format, etc. The data format that can be processed by a certain solution to the solved problem may be incompatible with the data format of the raw data to be processed for to-be-solved problem 330.

In the embodiments considering the data format, after search subsystem 312 finds the target solved problem that matches to-be-solved problem 330, it may also acquire a set of knowledge elements from knowledge repository 320 based on the data format of the raw data to be processed for to-be-solved problem 330, so that the solution corresponding to these knowledge elements is suitable for the data format of the raw data.

Figure 4:
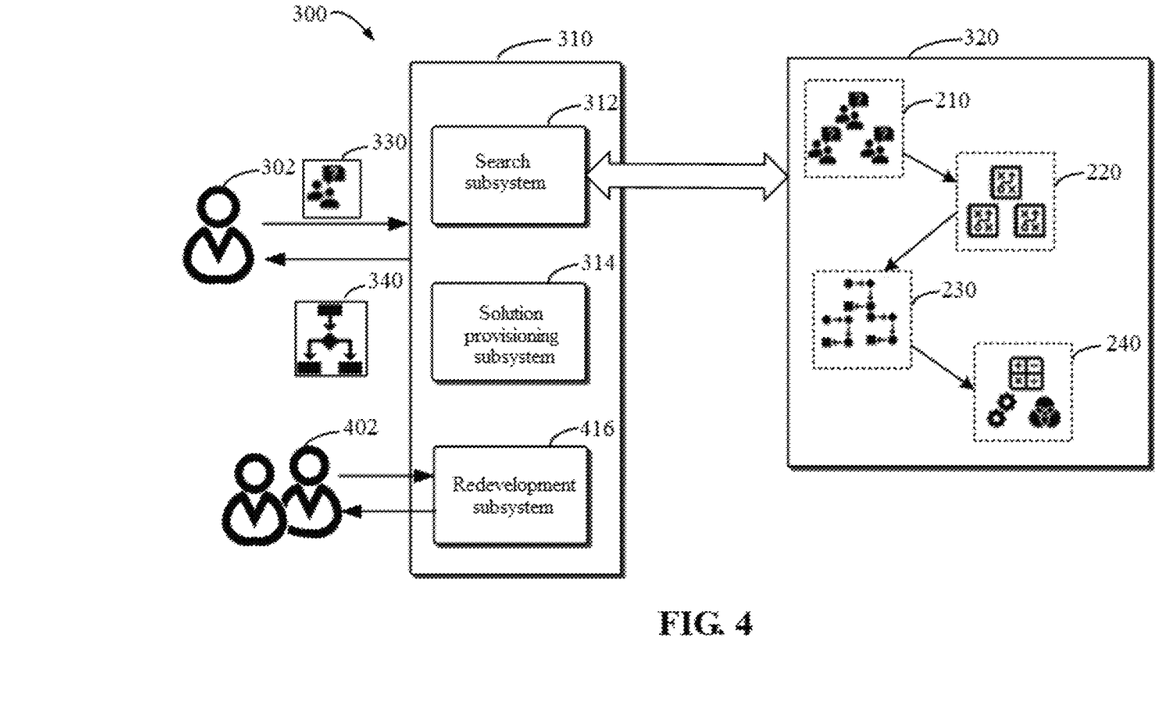
FIG. 4 illustrates a schematic diagram of an environment for implementing automatic problem solving according to other embodiments of the present disclosure.

In some cases, search subsystem 312 may not be able to search the target solved problem that matches to-be-solved problem 330 from knowledge repository 320, and thus cannot directly obtain a complete solution to to-be-solved problem 330. At this time, to-be-solved problem 330 may be recorded in knowledge repository 320. In order to obtain a solution, some auxiliary information may also need to be introduced to make the best use of other knowledge elements in knowledge repository 320. In some embodiments, more information related to to-be-solved problem 330 may be obtained in other manners, such as through the participation of a technician, in order to assist in determining a solution to to-be-solved problem 330. FIG. 4 illustrates an example of environment 300 of such an embodiment.

Compared to FIG. 3, in the example of FIG. 4, computing system 310 also includes redevelopment subsystem 416 which is configured to guide user 402 to provide more information related to to-be-solved problem 330. User 402 may be, for example, a technician capable of participating in problem solving, such as a data analyst, a technical developer, or the like. In some examples, user 402 and user 302 may be the same user.

In operation, if search subsystem 312 searches out from knowledge repository 320 a target solved problem that matches to-be-solved problem 330, redevelopment subsystem 416 is activated to provide user 402 with a request to indicate a source executable task related to to-be-solved problem 330. Redevelopment subsystem 416 may provide this request to user 402, for example, a client device of user 402. Redevelopment subsystem 416 may also have a user interface to display this request. The request may include the problem description of to-be-solved problem 330.

In response to the request, user 402 may analyze to-be-solved problem 330 and manually determine one or more source executable tasks related to to-be-solved problem 330. Redevelopment subsystem 416 can obtain a task description of the one or more source executable tasks related to to-be-solved problem 330, which is input by user 402. In this way, to-be-solved problem 330 is transformed into more detailed source executable tasks. In some embodiments, redevelopment subsystem 416 also indicates to user 402 the raw data to be processed for to-be-solved problem 330 in order to assist user 402 in determining the source executable tasks.

After redevelopment subsystem 416 obtains the task description of the one or more source executable tasks related to to-be-solved problem 330, search subsystem 312 may be triggered again to perform a search in knowledge repository 320. In this search, search subsystem 312 searches, based on the task description of the one or more source executable tasks, for a target executable task that matches each source executable task from executable tasks 220 stored in knowledge repository 320.

Regarding executable task 220 related to each solved problem 210, knowledge repository 320 also stores a corresponding task description. Search subsystem 312 may determine whether a target executable task matching the source executable task exists in knowledge repository 320 based on the matching degree between the problem descriptions, for example, a target executable task with the same or similar problem description. The task search may also be similar to the problem search discussed above.

If the target executable task matching the source executable task can be searched out from knowledge repository 320, search subsystem 312 can acquire, according to the found target executable task, from knowledge repository 320 a second set of knowledge elements including: a target processing flow for implementing the target executable task and a group of function modules included in the target processing flow. These knowledge elements are stored in knowledge repository 320 as being associated with the target executable task, for example, as having a corresponding direct link or indirectly pointing to the target executable task, and thus they can be extracted from knowledge repository 320 starting from the target executable task.

The second set of knowledge elements acquired by search subsystem 312 is provided to solution provisioning subsystem 314. Solution provisioning subsystem 314 can form the second set of knowledge elements together with the source executable task of to-be-solved problem 330 into the solution 340 to to-be-solved problem 330. In some embodiments, multiple processing flows for implementing the target executable task may be stored in knowledge repository 320, then multiple sets of knowledge elements can be acquired accordingly to form multiple solutions 340 to to-be-solved problem 330.

In the task search process, search subsystem 312 can also further take into consideration the data format of the raw data to be processed for to-be-solved problem 330, so that the solution corresponding to the knowledge elements acquired from knowledge repository 320 is suitable for the data format of the raw data.

In some cases, search subsystem 312 may still be unable to search the target executable task matching the source executable task of to-be-solved problem 330 from knowledge repository 320. In this situation, in knowledge repository 320, to-be-solved problem 330 can be stored in association with one or more source executable tasks for search, for the purpose of subsequent tracking. In addition, in order to obtain a solution to the current to-be-solved problem 330, user 402 may be further requested to provide more information related to to-be-solved problem 330.

Specifically, in the case where search subsystem 312 cannot find a matching target executable task based on the source executable task, or even in the case where the matching target solved problem cannot be found based on to-be-solved problem 330, redevelopment subsystem 416 can be triggered to provide user 402 with a request to designate function modules included in the source processing flow of to-be-solved problem 330. This request may be provided, for example, via the user interface of redevelopment subsystem 416, or be provided to the client device of user 402. This request may include the problem description of to-be-solved problem 330 and the task description of the one or more source executable tasks related to to-be-solved problem 330.

In response to the request, user 402 may analyze to-be-solved problem 330, and the one or more related source executable tasks, and develop or design a portion of the source processing flow for implementing each source executable task, such as one or more source function modules in the source processing flow. In addition, user 402 may also expect to acquire some existing function modules from knowledge repository 320 to implement the entire processing flow. Therefore, user 402 can determine the function description of the one or more source function modules included in the source processing flow. In some embodiments, redevelopment subsystem 416 also indicates to user 402 the raw data to be processed for to-be-solved problem 330, so as to assist user 402 in defining the function description of the corresponding source function module.

Redevelopment subsystem 416 can obtain the function description of the one or more source function modules which is input by user 402. In this case, the requirement of solving to-be-solved problem 330 is transformed into the requirement for specific function modules. Redevelopment subsystem 416 may trigger search subsystem 312 to perform a search in knowledge repository 320 again. In this search, search subsystem 312 searches, based on the function description of the one or more source function modules, for one or more target function modules matching the source function modules from the function modules 240 stored in knowledge repository 320.

Regarding the processing flow of the executable tasks for implementing the solved problem, knowledge repository 320 also stores the function description of the function modules therein. Search subsystem 312 may determine whether a target function module matching the source function module exists in knowledge repository 320 based on the matching degree between the problem descriptions, for example, a target function module with the same or similar function description. The function search may also be similar to the problem search and task search discussed above.

If a target function module matching the source function module can be found from knowledge repository 320, search subsystem 312 can obtain the matching target function module from knowledge repository 320 as a third knowledge element. Such an acquired knowledge element is provided to solution provisioning subsystem 314. Solution provisioning subsystem 314 can form the target function module indicated by the third knowledge element together with the source executable task of to-be-solved problem 330 and one or more processing flows for implementing the source executable task into solution 340 to to-be-solved problem 330.

In some embodiments, after determining solution 340 to to-be-solved problem 330, at least one of the following items is stored into knowledge repository 320: to-be-solved problem 330, one or more source executable tasks in solution 340, one or more source processing flows for implementing each source executable task, and the corresponding function modules included in each source processing flow. In some examples, as mentioned above, the to-be-solved problem 330 and one or more source executable tasks in solution 340 may have already been stored into knowledge repository 320 during the search attempt. In this way, solutions corresponding to new problems can be used to continuously update knowledge repository 320, so as to provide more referable knowledge for subsequent problem solving, thereby promoting a faster and more efficient determination of the solution.

It should be understood that, in the above embodiments, the description is provided sequentially of: starting from the description of the to-be-solved problem per se, introducing further participation of a technician in the situation where there is no matching target solved problem in order to continue to obtain a solution to the to-be-solved problem. In other embodiments, if possible, the computing system may be provided at an initial stage with a source executable task related to the to-be-solved problem or a function description of one or more function modules in the original processing flow. Based on such information, the knowledge repository can also be used to further acquire more knowledge elements so as to obtain a complete solution to the to-be-solved problem.

According to various embodiments of the present disclosure, knowledge related to an existing solution to a problem can be reused to simplify the process of determining a solution to a subsequent to-be-solved problem, thereby achieving highly efficient and low cost problem solving. In addition, in some embodiments, partial participation of a technician can also be introduced to further effectively utilize the existing knowledge elements. Compared to a process in which problem solving is entirely guided by a technician in a manual way, the problem solving process of the present disclosure is simpler and reduces the workload of the technician.

It should be understood that although search subsystem 312, the solution provisioning subsystem 314, and redevelopment subsystem 416 are shown as separate components in FIGS. 3 and 4, these subsystems can be implemented by individual devices separately or may be implemented collectively by multiple devices.

Figure 5:
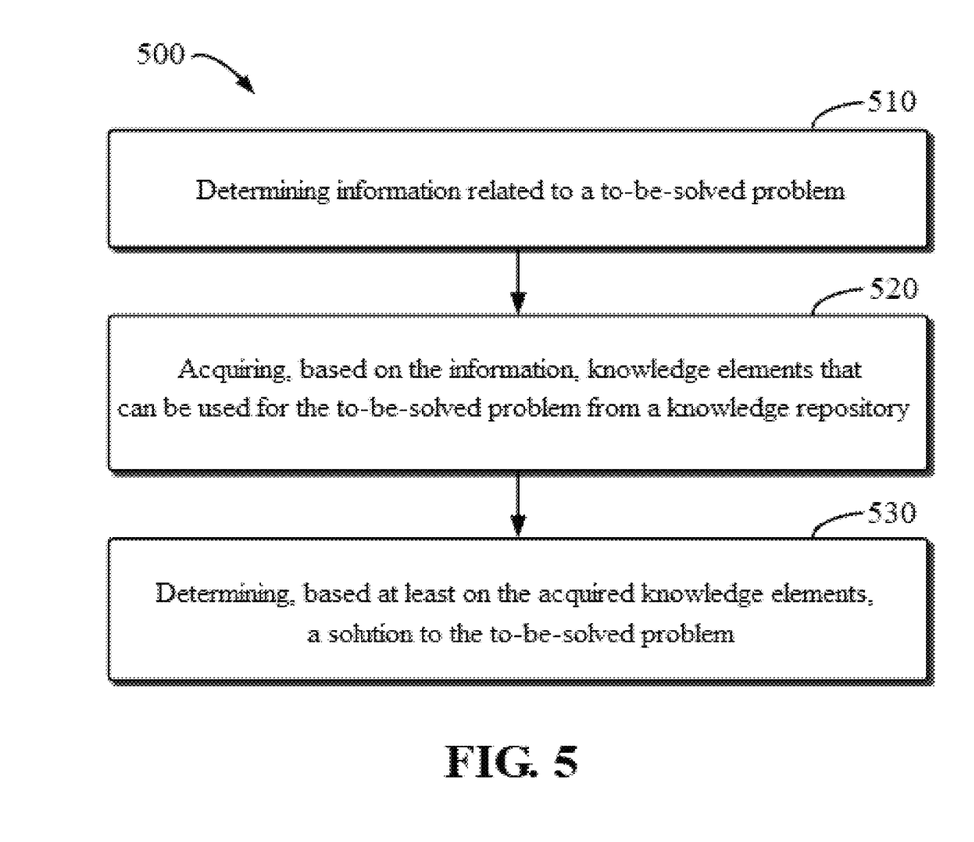
FIG. 5 illustrates a flowchart of a process for solving a problem according to some embodiments of the present disclosure.

FIG. 5 illustrates a flowchart of process 500 for solving a problem according to the embodiments of the present disclosure. Process 500 can be implemented by computing system 310 in FIG. 3.

In 510, computing system 310 determines information related to a to-be-solved problem. In 520, computing system 310 acquires, based on the information, knowledge elements that can be used for the to-be-solved problem from a knowledge repository which stores: solved problems, at least one executable task related to the solved problems, at least one processing flow for implementing the at least one executable task, and a corresponding function module included in the at least one processing flow. In 530, computing system 310 determines, based at least on the acquired knowledge elements, a solution to the to-be-solved problem.

In some embodiments, the information includes problem description of the to-be-solved problem. In some embodiments, acquiring knowledge elements includes: searching, based on the problem description, the knowledge repository for a target solved problem matching the to-be-solved problem; and acquiring, according to the finding of the matching target solved problem, from the knowledge repository a first set of knowledge elements including: a target executable task related to the target solved problem, a target processing flow for implementing the target executable task, and a corresponding function module included in the target processing flow.

In some embodiments, the information includes task description of a source executable task related to the to-be-solved problem. In some embodiments, acquiring knowledge elements includes: searching, based on the task description, the knowledge repository for a target executable task matching the source executable task; and acquiring, according to the finding of the matching target executable task, from the knowledge repository a second set of knowledge elements including: a target processing flow for implementing the target executable task, and a corresponding function module included in the target processing flow.

In some embodiments, determining information related to a to-be-solved problem includes: providing to a user, according to a failure to find the target solved problem matching the to-be-solved problem from the knowledge repository, a request to designate the source executable task related to the to-be-solved problem; and receiving the task description of the source executable task related to the to-be-solved problem.

In some embodiments, the information includes a function description of a source function module included in a source processing flow which is used for implementing a source executable task related to the to-be-solved problem. In some embodiments, acquiring knowledge elements includes: searching, based on the function description, the knowledge repository for a target function module matching the source function module; and acquiring, according to the finding of the matching target function module, the target function module from the knowledge repository as a third knowledge element.

In some embodiments, determining information related to a to-be-solved problem includes: providing to a user, according to a failure to find the target executable task matching the source executable task from the knowledge repository, a request to designate the function module included in the source processing flow; and receiving the function description of the function module included in the source processing flow.

In some embodiments, determining the solution includes: determining the solution to include a source executable task related to the to-be-solved problem, a source processing flow for implementing the source executable task, and a corresponding function module included in the source processing flow.

In some embodiments, process 500 further includes: storing at least one of the to-be-solved problem, the source executable task, the source processing flow, and the corresponding function module included in the source processing flow to the knowledge repository as knowledge elements.

In some embodiments, process 500 further includes: determining a data format related to raw data to be processed for the to-be-solved problem. Acquiring the knowledge elements further includes: further determining the knowledge elements from the knowledge repository based on the data format, so that the solution corresponding to the knowledge elements is suitable for the data format.

In some embodiments, the to-be-solved problem and the solved problems include abstract problems, wherein the executable task includes a machine learning task, and wherein the processing flow includes an algorithm pipeline.

Figure 6:
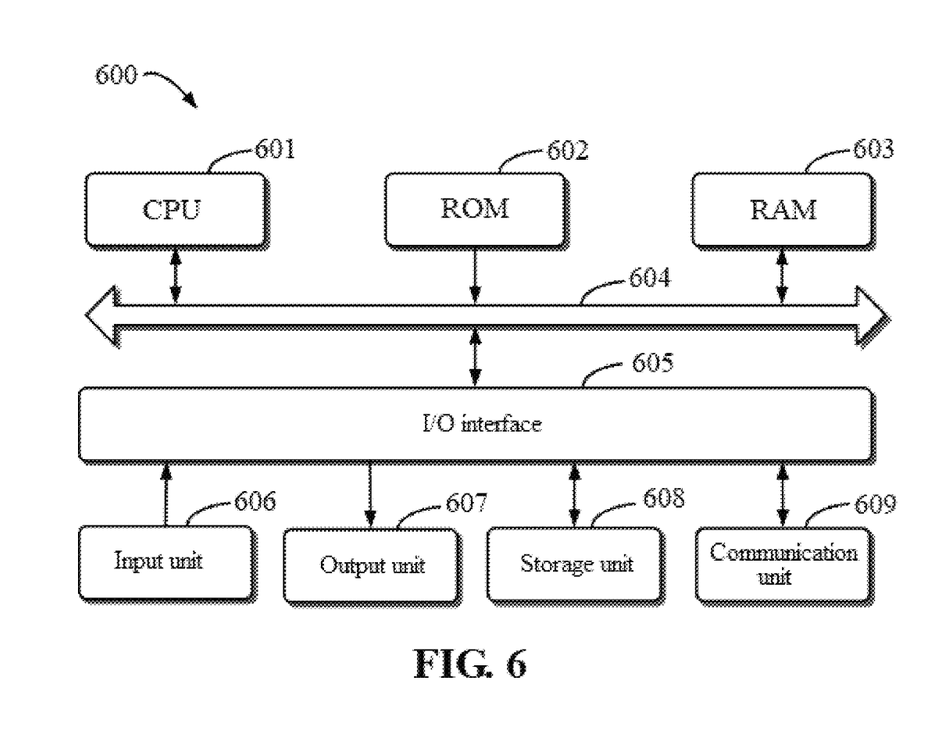
FIG. 6 illustrates a block diagram of an example device that can be used to implement the embodiments of the present disclosure.

FIG. 6 illustrates a schematic block diagram of an example device 600 that can be used to implement the embodiments of the present disclosure. Device 600 can be used for implementing process 500 in FIG. 5. Computing system 310 in FIG. 3 may, for example, include one or more devices 600.

As shown, device 600 includes central processing unit (CPU) 601 which can perform various appropriate actions and processes according to computer program instructions stored in read only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as, for example, a keyboard, and a mouse; output unit 607, such as, for example, various types of displays, and speakers; storage unit 608, such as, for example, a magnetic disk, and an optical disk; and communication unit 609, such as, for example, a network card, a modem, and a wireless communication transceiver. Communication unit 609 allows device 600 to exchange information/data with other devices through a computer network such as the Internet and/or various telecommunication networks.

CPU 601 performs various methods and processing described above, such as process 500. For example, in some embodiments, process 500 may be implemented as a computer software program or a computer program product that is tangibly embodied on a machine-readable medium, such as a non-transitory computer-readable medium, such as storage unit 608. In some embodiments, part or all of the computer program may be loaded and/or installed on device 600 via ROM 602 and/or communication unit 609. When a computer program is loaded into RAM 603 and executed by CPU 601, one or more steps of process 500 described above may be performed. Alternatively, in other embodiments, CPU 601 may be configured to perform process 500 in any other suitable manner (for example, by means of firmware).

Those skilled in the art should understand that each step of the method of the present disclosure described above can be implemented by a general-purpose computing device. They can be centralized on a single computing device or distributed on a network composed of multiple computing devices. Alternatively, they can be implemented with program code executable by the computing device, so that they can be stored in a storage device and executed by the computing device; or they can be made into individual integrated circuit modules separately, or multiple modules or steps of them can be made into a single integrated circuit module. As such, the present disclosure is not limited to any particular combination of hardware and software.

It should be understood that although several components or sub-components of the device are mentioned in the detailed description above, this division is merely exemplary and not mandatory. In fact, according to the embodiments of the present disclosure, the features and functions of two or more components described above may be embodied in one component. Conversely, the features and functions of one component described above can be further divided into multiple components in a given embodiment.

What described above are merely optional embodiments of the present disclosure and are not intended to limit the present disclosure. For those skilled in the art, the present disclosure may have various modifications and variations. Any modification, equivalent replacement, and improvement made within the spirit and principle of this disclosure shall be included in the protection scope of this disclosure.

What is claimed is:

1. A method for solving a problem, comprising:
   determining information related to a to-be-solved problem;
   acquiring, based on the information related to the to-be-solved problem, knowledge elements that are used for the to-be-solved problem from a knowledge repository, wherein the knowledge repository stores: solved problems, at least one executable task related to the solved problems, at least one processing flow for implementing the at least one executable task, and a corresponding function module included in the at least one processing flow;
   determining, based at least on the acquired knowledge elements, a solution to the to-be-solved problem;
   updating the knowledge repository based on the solution to the to-be-solved problem; and
   automatically utilizing the updated knowledge repository to determine a solution to a subsequent to-be-solved problem;
   wherein acquiring the knowledge elements comprises:
   acquiring, based on the information related to the to-be-solved problem, a set of knowledge elements including: a target executable task related to a target solved problem matching the to-be-solved problem, a target processing flow for implementing the target executable task, and a corresponding function module included in the target processing flow from the knowledge repository.

2. The method of claim 1, wherein the information related to the to-be-solved problem comprises a problem description of the to-be-solved problem, and wherein acquiring the knowledge elements further comprises:
   searching, based on the problem description of the to-be-solved problem, the knowledge repository for the target solved problem matching the to-be-solved problem; and
   acquiring, according to a finding of the target solved problem matching the to-be-solved problem, the target executable task related to the target solved problem matching the to-be-solved problem, the target processing flow for implementing the target executable task, and the corresponding function module included in the target processing flow from the knowledge repository as at least a portion of the set of knowledge elements.

3. The method of claim 1, wherein the information related to the to-be-solved problem comprises a task description of a source executable task related to the to-be-solved problem, and wherein acquiring the knowledge elements further comprises:
   searching, based on the task description of the source executable task, the knowledge repository for the target executable task matching the source executable task; and
   acquiring, according to a finding of the target executable task matching the source executable task, the target processing flow for implementing the target executable task, and the corresponding function module included in the target processing flow from the knowledge repository as at least a portion of the set of knowledge elements.

4. The method of claim 3, wherein determining the information related to the to-be-solved problem comprises:
   providing to a user, according to a failure to find the target solved problem matching the to-be-solved problem from the knowledge repository, a request to designate the source executable task related to the to-be-solved problem; and
   receiving the task description of the source executable task related to the to-be-solved problem.

5. The method of claim 1, wherein the information related to the to-be-solved problem comprises a function description of a source function module included in a source processing flow which is used for implementing a source executable task related to the to-be-solved problem, and wherein acquiring the knowledge elements further comprises:
   searching, based on the function description of the source function module, the knowledge repository for a target function module matching the source function module; and
   acquiring, according to a finding of the target function module matching the source function module, the target function module from the knowledge repository as at least a portion of the set of knowledge elements.

6. The method of claim 5, wherein determining the information related to the to-be-solved problem comprises:
   providing to a user, according to a failure to find the target executable task matching the source executable task from the knowledge repository, a request to designate the source function module included in the source processing flow; and
   receiving the function description of the source function module included in the source processing flow.

7. The method of claim 1, wherein determining the solution to the to-be-solved problem comprises:
   determining the solution to the to-be-solved problem to comprise a source executable task related to the to-be-solved problem, a source processing flow for implementing the source executable task, and a corresponding function module included in the source processing flow.

8. The method of claim 7, further comprising:
   storing the to-be-solved problem, the source executable task, the source processing flow, and the corresponding function module included in the source processing flow to the knowledge repository as the knowledge elements.

9. The method of claim 1, further comprising:
   determining a data format related to raw data to be processed for the to-be-solved problem, wherein acquiring the knowledge elements further comprises determining the knowledge elements from the knowledge repository based on the data format, so that the solution to the to-be-solved problem corresponding to the knowledge elements is suitable for the data format.

10. The method of claim 1, wherein the to-be-solved problem and the solved problems comprise abstract problems, wherein the at least one executable task comprises a machine learning task, and wherein the at least one processing flow comprises an algorithm pipeline.

11. A computing system, comprising:
    at least one processor; and
    at least one memory storing computer program instructions, wherein the at least one memory and the computer program instructions are configured to control the at least one processor to perform actions, the actions comprising:

determining information related to a to-be-solved problem;

acquiring, based on the information related to the to-be-solved problem, knowledge elements that are used for the to-be-solved problem from a knowledge repository, wherein the knowledge repository stores: solved problems, at least one executable task related to the solved problems, at least one processing flow for implementing the at least one executable task, and a corresponding function module included in the at least one processing flow;

determining, based at least on the acquired knowledge elements, a solution to the to-be-solved problem;

updating the knowledge repository based on the solution to the to-be-solved problem; and automatically utilizing the updated knowledge repository to determine a solution to a subsequent to-be-solved problem;

wherein acquiring the knowledge elements comprises:

acquiring, based on the information related to the to-be-solved problem, a set of knowledge elements including: a target executable task related to a target solved problem matching the to-be-solved problem, a target processing flow for implementing the target executable task, and a corresponding function module included in the target processing flow from the knowledge repository.

12. The computing system of claim 11, wherein the information related to the to-be-solved problem comprises a problem description of the to-be-solved problem, and wherein acquiring the knowledge elements further comprises:

searching, based on the problem description of the to-be-solved problem, the knowledge repository for the target solved problem matching the to-be-solved problem; and acquiring, according to a finding of the target solved problem matching the to-be-solved problem, the target executable task related to the target solved problem matching the to-be-solved problem, the target processing flow for implementing the target executable task, and the corresponding function module included in the target processing flow from the knowledge repository as at least a portion of the set of knowledge elements.

13. The computing system of claim 11, wherein the information related to the to-be-solved problem comprises a task description of a source executable task related to the to-be-solved problem, and wherein acquiring the knowledge elements further comprises:

searching, based on the task description of the source executable task, the knowledge repository for the target executable task matching the source executable task; and acquiring, according to a finding of the target executable task matching the source executable task, the target processing flow for implementing the target executable task, and the corresponding function module included in the target processing flow from the knowledge repository as at least a portion of the set of knowledge elements.

14. The computing system of claim 13, wherein determining the information related to the to-be-solved problem comprises:

providing to a user, according to a failure to find the target solved problem matching the to-be-solved problem from the knowledge repository, a request to designate the source executable task related to the to-be-solved problem; and receiving the task description of the source executable task related to the to-be-solved problem.

15. The computing system of claim 11, wherein the information related to the to-be-solved problem comprises a function description of a source function module included in a source processing flow which is used for implementing a source executable task related to the to-be-solved problem, and wherein acquiring the knowledge elements further comprises:

searching, based on the function description of the source function module, the knowledge repository for a target function module matching the source function module; and acquiring, according to a finding of the target function module matching the source function module, the target function module from the knowledge repository as at least a portion of the set of knowledge elements.

16. The computing system of claim 15, wherein determining the information related to the to-be-solved problem comprises:

providing to a user, according to a failure to find the target executable task matching the source executable task from the knowledge repository, a request to designate the source function module included in the source processing flow; and receiving the function description of the source function module included in the source processing flow.

17. The computing system of claim 11, wherein determining the solution to the to-be-solved problem comprises:

determining the solution to the to-be-solved problem to comprise a source executable task related to the to-be-solved problem, a source processing flow for implementing the source executable task, and a corresponding function module included in the source processing flow.

18. The computing system of claim 17, wherein the actions further comprise at least one of:

storing the to-be-solved problem, the source executable task, the source processing flow, and the corresponding function module included in the source processing flow to the knowledge repository as the knowledge elements; and determining a data format related to raw data to be processed for the to-be-solved problem, wherein acquiring the knowledge elements further comprises determining the knowledge elements from the knowledge repository based on the data format, so that the solution to the to-be-solved problem corresponding to the knowledge elements is suitable for the data format.

19. The computing system of claim 11, wherein the to-be-solved problem and the solved problems comprise abstract problems, wherein the at least one executable task comprises a machine learning task, and wherein the at least one processing flow comprises an algorithm pipeline.

20. A computer program product, the computer program product being tangibly stored on a non-volatile computer-readable medium and including machine-executable instructions which, when being executed, cause a device to implement a method for solving a problem, comprising:

determining information related to a to-be-solved problem;

acquiring, based on the information related to the to-be-solved problem, knowledge elements that are used for the to-be-solved problem from a knowledge repository, wherein the knowledge repository stores: solved problems, at least one executable task related to the solved problems, at least one processing flow for implementing the at least one executable task, and a corresponding function module included in the at least one processing flow;

determining, based at least on the acquired knowledge elements, a solution to the to-be-solved problem;

updating the knowledge repository based on the solution to the to-be-solved problem; and automatically utilizing the updated knowledge repository to determine a solution to a subsequent to-be-solved problem;

wherein acquiring the knowledge elements comprises:

acquiring, based on the information related to the to-be-solved problem, a set of knowledge elements including: a target executable task related to a target solved problem matching the to-be-solved problem, a target processing flow for implementing the target executable task, and a corresponding function module included in the target processing flow from the knowledge repository.

* * * * *